US011379671B2

(12) United States Patent
Alexander et al.

(10) Patent No.: US 11,379,671 B2
(45) Date of Patent: Jul. 5, 2022

(54) IDENTIFICATION OF RESPONSE LIST

(71) Applicant: salesforce.com, inc., San Francisco, CA (US)

(72) Inventors: Zachary Alexander, Berkeley, CA (US); Edgar Gerardo Velasco, San Francisco, CA (US); Victor Winslow Yee, Berkeley, CA (US); Na Cheng, Dublin, CA (US); Khoa Le, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 240 days.

(21) Appl. No.: 16/687,626

(22) Filed: Nov. 18, 2019

(65) Prior Publication Data

US 2021/0150146 A1  May 20, 2021

(51) Int. Cl.
*G06F 40/30* (2020.01)
*G06F 16/33* (2019.01)
*G06N 20/00* (2019.01)
*G06F 16/332* (2019.01)

(52) U.S. Cl.
CPC .......... *G06F 40/30* (2020.01); *G06F 16/3329* (2019.01); *G06F 16/3344* (2019.01); *G06F 16/3347* (2019.01); *G06N 20/00* (2019.01)

(58) Field of Classification Search
CPC .. G06F 40/30; G06F 16/3347; G06F 16/3344; G06F 16/3329; G06N 20/00
USPC .................................................. 704/9, 10, 1
See application file for complete search history.

(56) References Cited

U.S. PATENT DOCUMENTS

| | | | | |
|---|---|---|---|---|
| 7,720,675 | B2* | 5/2010 | Burstein | G06F 40/253 704/10 |
| 10,757,043 | B2* | 8/2020 | Gershony | H04L 51/02 |
| 10,861,456 | B2* | 12/2020 | Tran | G06N 3/0445 |
| 11,074,253 | B2* | 7/2021 | Bordawekar | G06F 16/283 |
| 2012/0323932 | A1* | 12/2012 | Xin | G06F 16/367 707/749 |
| 2014/0229474 | A1* | 8/2014 | Or | G06F 16/3326 707/728 |
| 2015/0046417 | A1* | 2/2015 | Kanemoto | G06F 16/907 707/702 |
| 2017/0235820 | A1* | 8/2017 | Conrad | G06F 40/295 707/728 |
| 2017/0308523 | A1* | 10/2017 | Wang | G06F 40/289 |
| 2017/0372204 | A1* | 12/2017 | Sweeney | G06N 5/02 |
| 2018/0150739 | A1* | 5/2018 | Wu | G06N 20/10 |
| 2020/0159997 | A1* | 5/2020 | Wu | G06N 3/0454 |
| 2020/0242642 | A1* | 7/2020 | Thimsen | G06F 16/36 |
| 2020/0410157 | A1* | 12/2020 | van de Kerkhof | G06F 40/166 |

* cited by examiner

*Primary Examiner* — Akwasi M Sarpong
(74) *Attorney, Agent, or Firm* — Holland & Hart LLP

(57) ABSTRACT

A system is configured to analyze a corpus of historical chat data to identify the list of "best" responses. As such, the user is not required to identify a list of canned responses for input into the system. The described system uses a context word embedding function and response word embedding function to generate context vectors and response vectors corresponding to the corpus of conversation data, and the vectors are represented by a respective context matrix and a response matrix. The system processes these matrices to generate scores for responses, clusters the responses, and identifies the responses corresponding to the best scores for each cluster.

21 Claims, 11 Drawing Sheets

IDENTIFICATION OF RESPONSE LIST

FIELD OF TECHNOLOGY

The present disclosure relates generally to database systems and data processing, and more specifically to identification of response list.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support a chat system that allows a customer support agent to live-chat with a customer. The chat may be utilized to help a customer regarding purchases, returns, order status, etc. An agent, which uses the chat system to converse with the customer, may periodically reply with the same or similar responses to customer inputs, which may be time consuming, and thus expensive, for the agent or the agent's organization.

DETAILED DESCRIPTION

Figure 1:
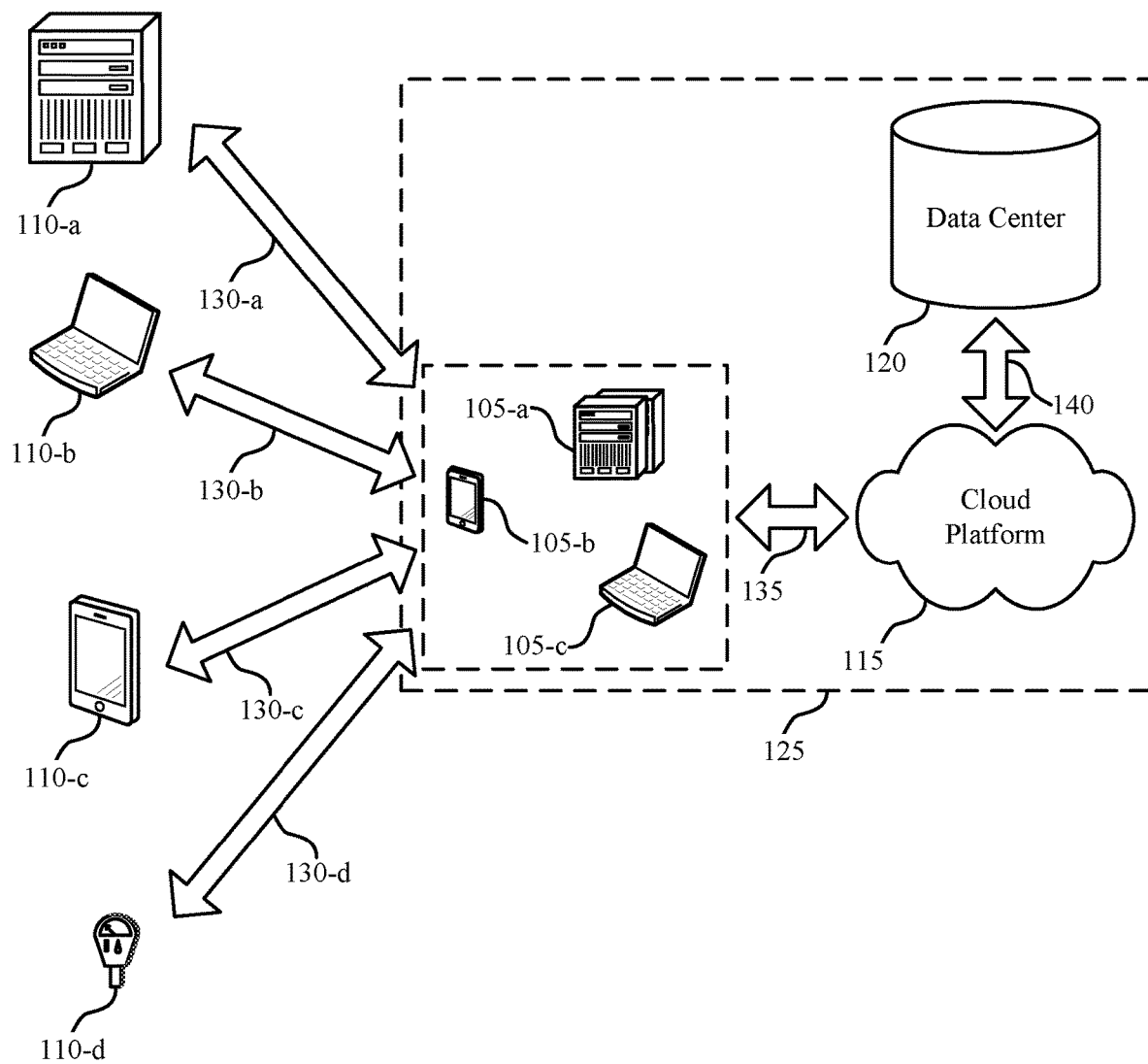
FIG. 1 illustrates an example of a system for processing a corpus of conversation data to automatically generate a set of candidate responses corresponding to contexts extracted from the conversation data that supports identification of response list in accordance with aspects of the present disclosure.

An online service may provide a chat system, in which users, such as customers, may chat with agents of the online service to seek help, information, etc. In various scenarios, users may be seeking similar responses or information from agents. Thus, an agent may provide similar information repeatedly to different customers, which may cause resources to be wasted answering the same questions with the same information. In some cases, a system may provide a list of suggested responses to an agent, and the agent may be able to select from the list of responses for replying to a customer. For example, a chat system may include a trained, deep learning model that is configured to recommend a response to an agent for responding to a particular customer request. Such systems may require manually inputting a list of candidate responses into a machine learning model, where the machine learning model would learn which of the candidate responses from the submitted list should be recommended in response to certain requests.

Implementations described herein provide a system that is configured to analyze a corpus of historical chat data to identify a list of "best" responses. As such, the user is not required to identify a list of canned responses for input into the system. The described system uses a context word embedding function and response word embedding function to generate context vectors and response vectors corresponding to the corpus of conversation data, and the vectors are represented by a respective context matrix and a response matrix. The system processes these matrices to generate scores for responses, clusters the responses, and identifies the responses corresponding to the best scores for each cluster.

These word embedding functions are trained on structured data (e.g., conversation data) such that the data provides the basis for an informative model in that generated vectors corresponding to similar conversations may be "similar" (e.g., based on a distance or cosign similarity between the vectors). The system may perform various processing efficiency techniques such that the data may be efficiently processed by various types of computing systems to generate relevant and representative candidate responses. Further, the model (e.g., a word embedding function) may be used during live chats such that the inputs may be processed and relevant responses from the candidate list may be recommended to an agent (or automatically input).

The scores (referred to hereinafter as a coherence score) for each of the response vectors may be based on a set of similarity metrics and a set of fitness metrics for a particular response vector. In some cases, a particular response vector is compared to a set of other response vectors (e.g., every other response vector) to determine the set of similarity scores. In some cases, the set of similarity metrics is a binary vector, where each element represents another vector and indicates whether the particular response vector and the other response vector have a similarity score above a particular threshold (e.g., 0.85). Further, the particular response vector may be tested against each context vector to determine the set of fitness metrics for the particular response vector. The testing may include determining a probability or likelihood that the response corresponding to the particular response vector is associated with a context corresponding to a context vector, where association means that the response followed a sequence of inputs comprising the context in a conversation session. Thus, the set of fitness metrics may be a binary vector, where each element represents a context vector and represents whether the context vector or response vector likelihood is above a threshold (e.g., 0.85). Further, the coherence score may be generated based on a mutual information function using the set of similarity metrics and the set of fitness metrics. The coherence score may represent the intuition that a good candidate response is given a high probability by the model (e.g., fitness score) whenever it is also very similar to a true response for a context (e.g., similarity score). Using the coherence score, the system may identify the list of best candidate response.

Aspects of the disclosure are initially described in the context of an environment supporting an on-demand database service. Aspects of the disclosure are further described with respect to various computing system diagrams, such as a general system diagram, a matrix processing diagram, a model training diagram, and a process flow diagram. Aspects of the disclosure are further illustrated by and described with reference to apparatus diagrams, system diagrams, and flowcharts that relate to identification of response list.

FIG. 1 illustrates an example of a system 100 for cloud computing that supports identification of response list in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may offer an on-demand chat service to the cloud client 105. The cloud client 105 may utilize the chat service for customer support for the contacts 110, for example. In some example implementations, a contact 110 may access the chat service via a browser or an application at a device of the cloud client 105. For example, a cloud client 105 is an internet retailer, and customers of the internet retailer interact with agents of the internet retailer via the chat service. The customers may utilize the chat service to resolve issues or receive information regarding orders, returns, product issues, etc. Because agents may interact with many different customers via the chat service, the agents may enter similar responses to many different, but similar, inquiries. Implementations described herein provide a system that provides suggested responses to an agent responsive to a customer input. The implementations are described with respect to a text chat system, but it should be understood that the implementations are applicable to many types of interactive conversation service, such as, chat bots, intelligent assistants, email systems, voice chat systems, etc.

In some response recommendations systems, the recommended responses may be based on a static set of responses, and inputs by a user may be associated with categorized responses. For example, an input by a user that mentions "return," is responded to with a recommended response such as "are you seeking information on a return?" Such systems are functionally limited in that the systems do not account for many different types and methods of inquiry, the systems consider only the most previous input by the user, the systems require potential inputs to be labeled (e.g., categorized), and the set of responses that are selected may be limited to a few responses. Further, the set of static responses may be selected by a user or administrator of an organization. These static lists of responses may not represent a list of best responses or a list of responses that is based on past conversation data.

Aspects of the disclosure described herein provide a system that automatically generates a list of candidate responses that may be used in a live conversation session. The system utilizes a model that is trained, in an unsupervised manner, on unlabeled historical conversation data (e.g., a corpus of conversation data). A corpus of historical chat data may correspond to a particular cloud client 105, and thus the chat data is highly structured. To generate the list of candidate response, the system generates a set of response vectors and a set of context vectors using respective trained word embedding functions. These vectors are processed to determine coherence scores for response vectors, and the set of candidate responses are identified based on the coherence scores. Thus, the set of candidate responses are determined using chat data particular to the organization (e.g., using the organizations data), such that the data is structured, and thus the responses are reflective of the organization's practices and recommendations. Further, the system adopts various processing efficiencies such that the data may be efficiently processed to generate the list of candidate responses.

The identified list of candidate responses may be utilized during live chat sessions, such that inputs may be processed by the context word embedding function to output a context vector. The context vector may be compared to response vectors corresponding to the list of candidate responses. The response(s) with the highest similarity (e.g., cosine similarity) may be recommended to an agent or automatically input into the chat session (or other type of conversation agent).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use of the system 100, a cloud client 105 elects to utilize the response recommendation system. A corpus of historical chat data of the cloud client 105 is analyzed to train the response identification model. As will be described in more detail below, model training requires very little or no input on the part of any administrator. The corpus of conversation data may be reprocessed to identify a list of candidate responses. During use of the system by an agent and a user (e.g., a customer), conversation context (e.g., a sequence of inputs) are input into the system to generate context vectors, which are compared to the response vectors corresponding to the list of candidate responses. The similar response vectors are selected for recommendation to the agent. In some example implementations, a response is automatically input into the conversation session without selection by the agent.

Figure 2:
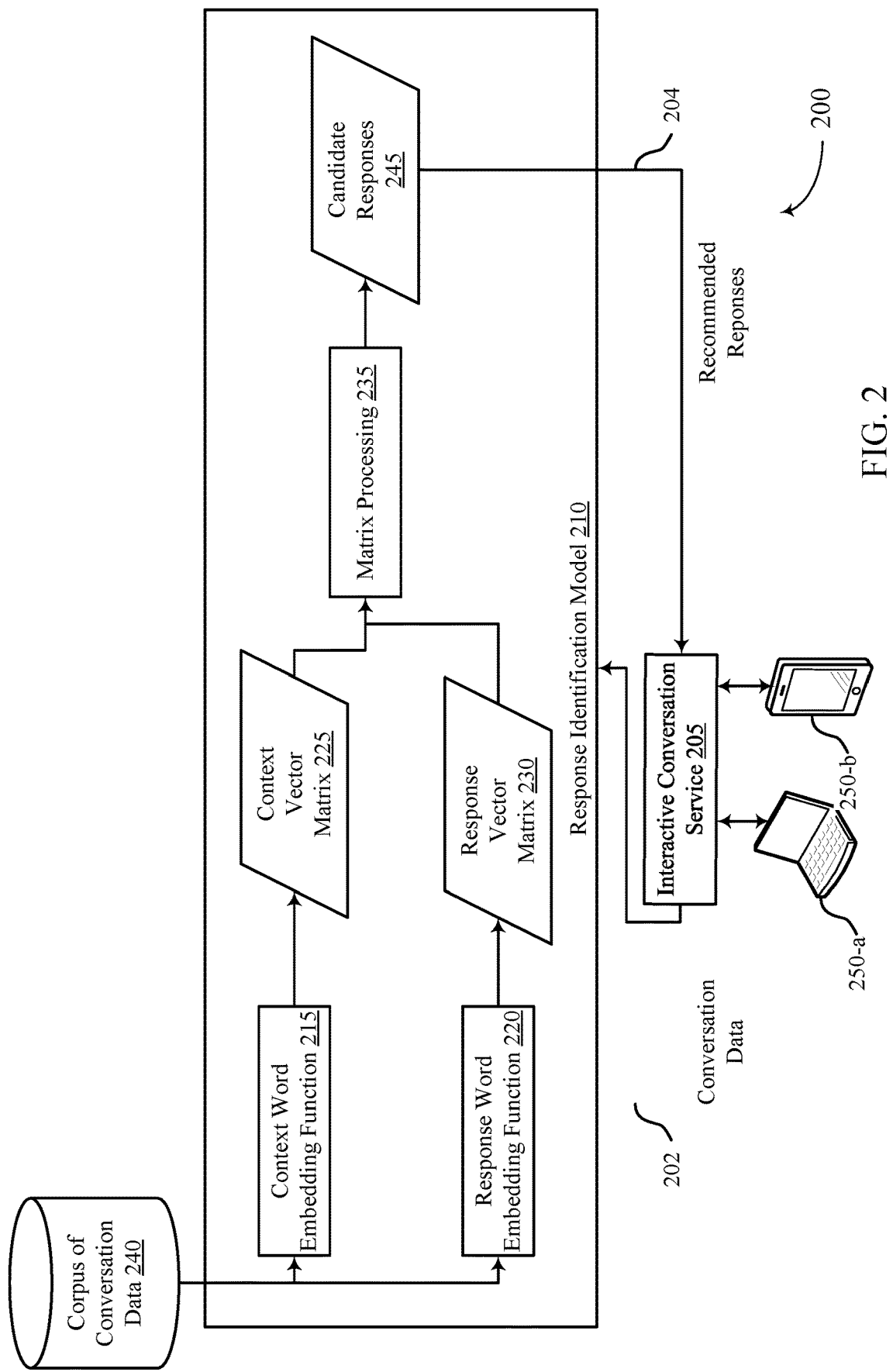
FIG. 2 illustrates an example of a computing system that supports identification of response list in accordance with aspects of the present disclosure.

FIG. 2 illustrates an example of a computing system 200 that supports identification of response list in accordance with aspects of the present disclosure. The computing system 200 includes a response identification model 210, which may be an example of a data processing component 615 of FIG. 6, includes a context word embedding function 215 and a response word embedding function 220. The context word embedding function 215 and the response word embedding function 220 may be trained on a corpus of conversation data 240 as described with respect to FIG. 4.

The context word embedding function 215 receives a context, which may include a sequence of inputs during a conversation session, and generates a context vector based on the context. The conversation session may include a conversation at a chat system, a transcript of a conversation, etc. The context may include inputs by two parties, including users an agents. The response word embedding function 220 receives a response, which may include an input by an agent (or another user or device) subsequent to a particular context, and generates a response vector based on the response input. Thus, the context word embedding function 215 may receive a context of a context-response pair and the response word embedding function 220 may receive a response of a context-response pair. The vectors are a mapping of the inputs (e.g., context or responses) to n dimensions of real numbers. Each word embedding function processes a series of respective context and response to generate matrices. The context word embedding function 215 generates a context vector matrix 225 and the response word embedding function may generate a response vector matrix 230.

Each row of the context vector matrix 225 may be associated with a row of the response vector matrix 230. That is, a vector that is row i in the response vector matrix 230 corresponds to the response following the context that is the basis for the context vector in row i in the context vector matrix 225. A matrix processing component 235 processes the context vector matrix 225 and the response vector matrix 230 to identify a list of candidate response 245 as described with respect to FIG. 3.

The response identification model 210 is linked to the interactive conversation service 205 via communication links 202 and 204. The response identification model 210 may receive live communication data between an agent and user (represented by devices 250) via the communication link 202, converts the communication data into a context vector, and compares the context vector to a set of response vectors corresponding to the list of candidate response 245 to determine recommended responses. The responses recommended by the response identification model 210 are transmitted to the interactive conversation service 205 via communication link 204, and the recommended responses may be displayed for selection by the agent in reply to an input by the user or automatically input into the live conversation session at the interactive conversation service 205.

Figure 3:
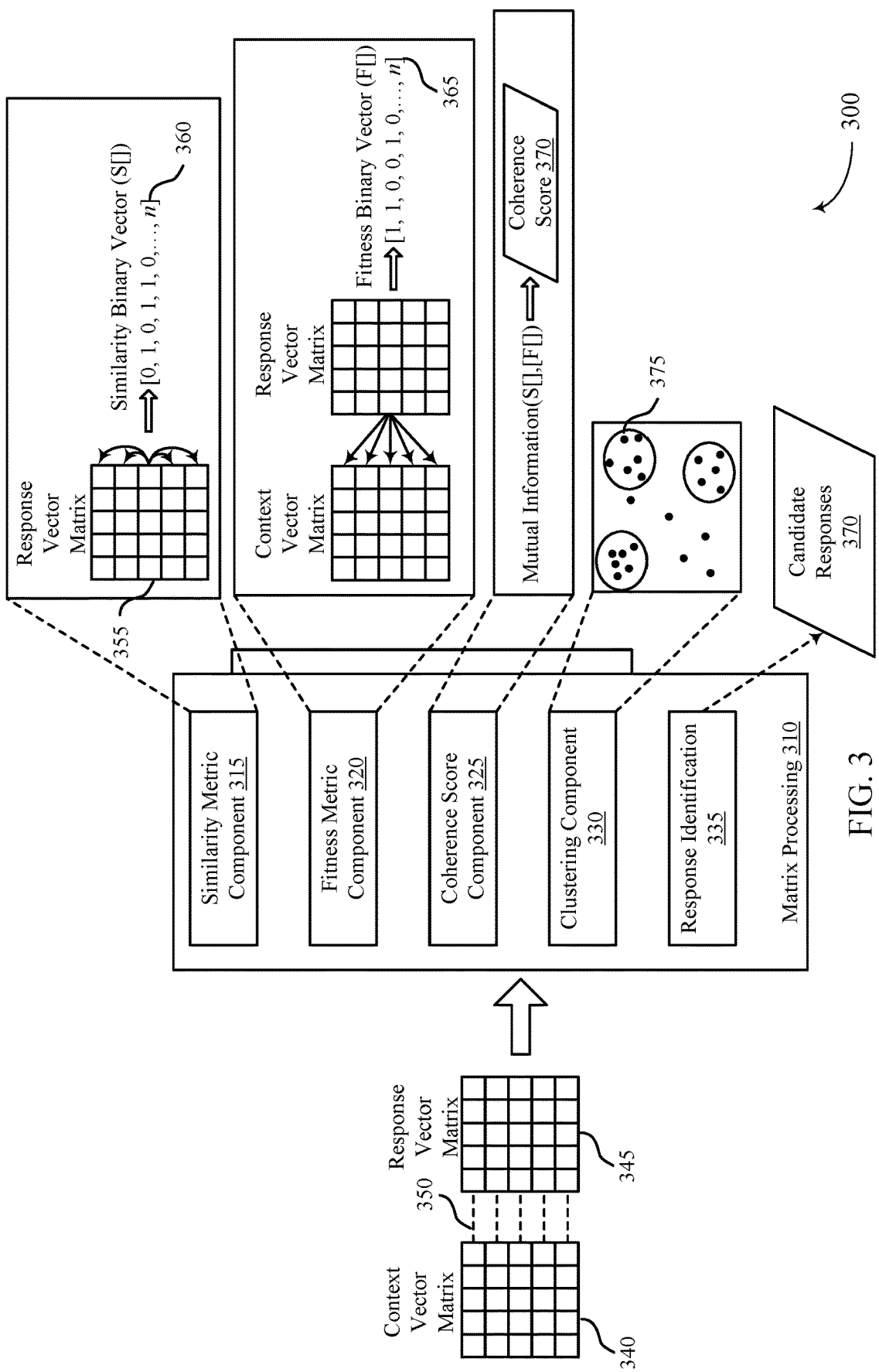
FIG. 3 illustrates an example of a matrix processing system that supports identification of response list in accordance with aspects of the present disclosure.

FIG. 3 illustrates an example of a matrix processing system 300 that supports identification of a response list in accordance with aspects of the present disclosure. The matrix processing system 300, which may be an example of the matrix processing component 235 of FIG. 2, may include various components for processing context vectors and response vectors output by a context word embedding function (e.g., context word embedding function 215 of FIG. 3) and a response word embedding function (e.g., response word embedding function 220 of FIG. 2). For example, the respective word embedding functions may generate a context vector matrix 340 and a response vector matrix 345. Each row/response vector of the response vector matrix 345 corresponds to a row/context vector of the context vector matrix 340, as illustrated by line 350. That is, each row of each matrix may correspond to a context-response pair identified from the same conversation session from a corpus of conversation data.

In some cases, the response vector matrix 345 is pre-processed to shorten a list of responses from which to identify the candidate responses. As such, the pre-processing may include association of a score with all context-response pairs (e.g. from the same row) by computing a sigmoid. The system may select responses that are greater than a threshold (e.g., >=0.85) for further consideration. This may allow the system to select a good response that has a high score according to the model. Further, this technique may provide some compute efficiencies, in that less response vectors are processed.

A similarity metric component 315 may process the response vector matrix 345 (or the remaining vectors of the matrix) to identify a set of similarity metrics for each response. For a response vector r 355, the similarity metric component 315 compares the response vector r 355 to the set of other response vectors to determine a similarity score between each pair (e.g., a cosine similarity). If the similarity is above a threshold (e.g., 0.9), then a corresponding element in a similarity binary vector 360 may be set with a value 1, and if the similarity is below the threshold, then the corresponding element may be set with a value of 0. This process may be performed for each candidate response vector r 355.

A fitness metric component 320 may process the response vector matrix 345 (or the remaining vectors after thresholding) and the context vector matrix 340 (or the corresponding remaining context vectors). For a response vector r 355, the fitness metric component 320 determines a likelihood or probability that the response vector r 355 corresponds to or is associated with each context vector such as to generate a probability for each context vector. That is, the model predicts the likelihood that the response corresponding to the response vector r 355 would be input in response to the context corresponding to a particular context vector based on the model configuration. If the prediction or likelihood is above a threshold (e.g., 0.9), then a corresponding element in a fitness binary vector 365 may be set with a value of 0, and if the similarity is below the threshold, then the corresponding element may be set with a value of 0. This process may be performed for each candidate response vector r 355.

A coherence score component 325 may identify a coherence score 370 for each candidate response vector r 355 based on the similarity binary vector 360 and the fitness binary vector 365 for the candidate response vector r 355. In some examples, the coherence score component 325 calculates the coherence score according to mutual information function using the vectors. If a response vector has a relatively high coherence score, then the response should have a high probability of being suggested by the model (e.g., fitness score) when the response is similar to the true response for a context (e.g., a similarity score).

In some cases, the similarity metric component 315, the fitness metric component 320, and the coherence score component 325, may function to identify the coherence score for each candidate response vector r (response r) using the following process:

F is the function that maps a partial conversation (context) to fixed length vector (e.g., context word embedding function).

G is the function that maps a candidate response to a fixed-length vector (e.g., the response word embedding function).

P is the probabilistic framework $P(response|context) \approx \sigmoid(<F(context), G(response)>)$.

r is a response with a corresponding response vector.

x is the binary vector of length n where $x_i=1$ if and only if (iff)$P(r|context_i; model)>0.9$.

y is the binary vector of length n where $y_i=1$ iff cosine similarity$(r, response_i)>0.9$.

coherence score$(r)$=mutual information $(x,y)$.

A clustering component 330 may cluster the candidate response vectors r based on the elements of the response vectors. In some cases, the clustering component 330 applies a density-based spatial cluster of applications with noise (DBSCAN) process to the set of candidate response vectors, although other clustering processes may be used. The DBSCAN process may be configured with various parameters. For example, the DBSCAN process may be configured to determine similarities using cosine distance. Further a parameter eps may be set equal to 0.1, such that responses are sufficiently close if their vectors are with a cosine distance of 0.1. Further, 2 may be the number of points to be within eps to be considered in a dense region. Each cluster 375 generated by clustering component 330 may correspond to a relatively homogenous (in meaning) set of responses.

A response identification component 335 may identity a set of response vectors by identifying one or more response vectors from each cluster 375 based on the coherence score for the response vectors. For example, the response identification component 335 may identify the top coherence scores (e.g., one or more) from each cluster, and select the corresponding vectors. The response identification component 335 may identify the responses corresponding to the selected responses as the set of candidate responses 380. Because each cluster 375 may correspond to a relatively homogenous (in meaning) set of responses, the responses with the top coherence scores represent response that work well according to the model.

Figure 4:
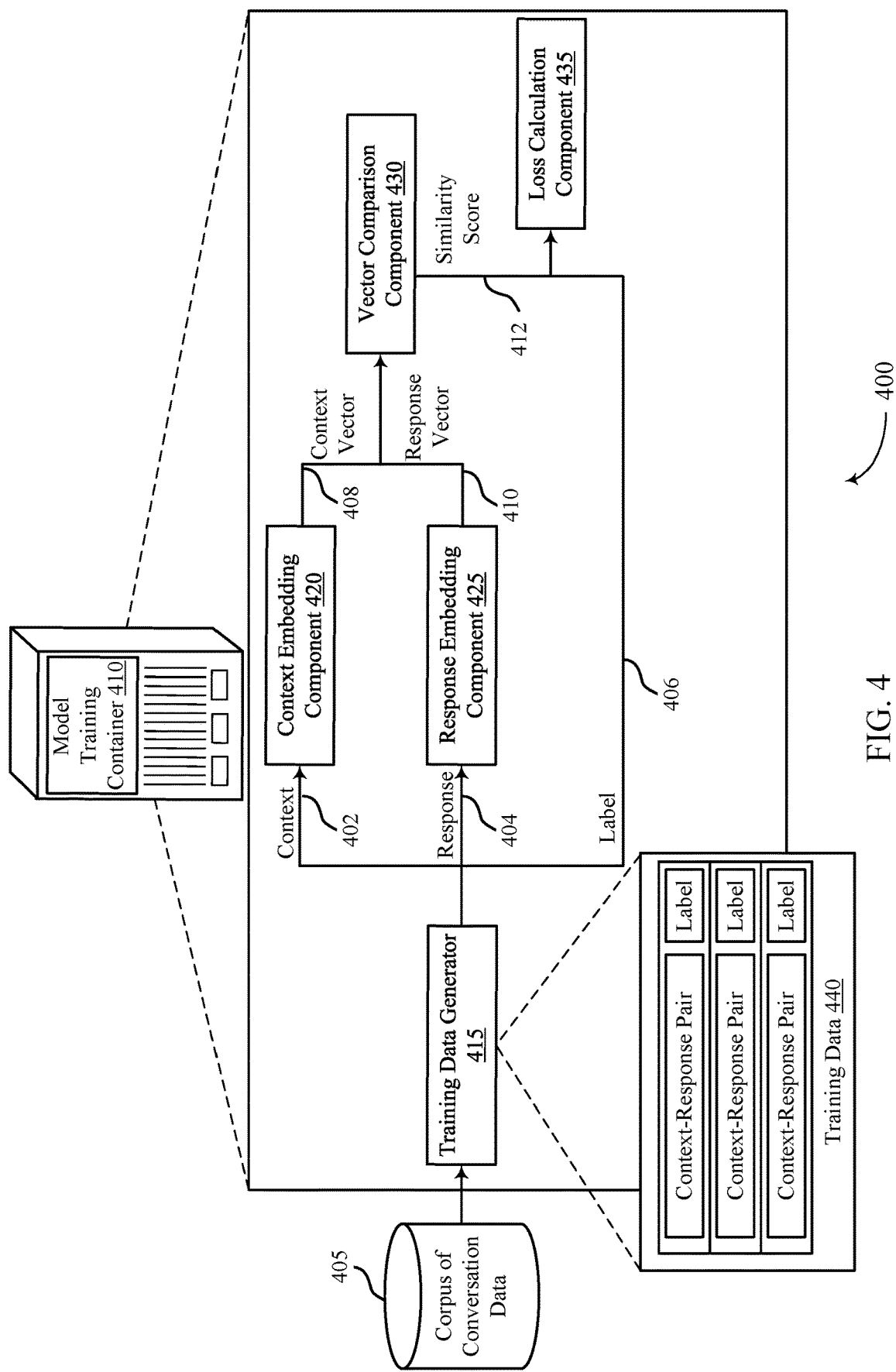
FIG. 4 illustrates an example of a model training system that supports identification of response list in accordance with aspects of the present disclosure.

FIG. 4 illustrates an example of a model training system 400 that supports identification of response list in accordance with aspects of the present disclosure. The system 400 includes a model training container 410, which uses a corpus of conversation data 405 to generate a response identification model. The model training container 410 generates training data 440 based on the corpus of conversation data 405. The training data 440 includes a set of context-response pairs and labels corresponding to each context-response pair. To generate the context-response pairs, the training data generator 415 may select a context corresponding to a conversation session. In some example implementations, a conversation session corresponds to interaction between a user and an agent before the conversation is closed by the user or the agent. The context includes a sequence of inputs by both the user and the agent. In some example implementations, the sequence of inputs is a predetermined number of inputs or includes substantially all inputs (e.g., before a response) of a conversation session. In some cases, the response includes the next input (e.g., following the selected sequence) by an agent during the conversation session (corresponding to a particular context), or the response includes a randomly selected input by an agent in the corpus of conversation data 405. When the response corresponds to a context in the same conversation session, the label corresponding to the context-response pair is given a first value (e.g., "1," which indicates that the pair is true or corresponds to the same conversation session). When the response is randomly selected for a context-response pair, the corresponding label is given a second value (e.g., "0," which indicates that the pair is false or does not correspond to the same conversation session).

A plurality of context-response pairs and labels may be generated for the training data 440. Some of the context-response pairs include true pairs that are selected from the same conversation session, and some of the context-response pairs are false pairs that are not selected from the same conversation session. The number of true pairs of the set may be configured by an administrator before the data is trained. Further, the number of inputs used for context may be configured by the administrator. The administrator may further configure the probability of choosing, by the training data generator 415, a positive example from later in a conversation session. This probability increases topic acuity by the model. The administrator may configure the probability of choosing a negative example from later in the same conversation session, which promotes temporal acuity.

Each context 402 of a context-response pair is input into a context embedding component 420 (e.g., a context word embedding function), and each response 404 is input into a response embedding component 425 (e.g., a response word embedding function). The context 402 and the response 404 may be pre-processed before being input into the respective components. Such pre-processing may be performed by the training data generator 415 and may include tokenizing the inputs. The context embedding component 420 and the response embedding component 425 may be examples of components enabling neural networks that map inputs to fixed-length vectors. The context embedding components 420 and response embedding components 425 may include or share processors and/or memory for processing data and generating vectors.

The context embedding component 420 generates a context vector 408 based on the input context 402, and the response embedding component 425 generates a response vector 410 based on the input response 404. For each context-response pair, a vector comparison component 430, compares the context vector 408 and the response vector 410 and outputs a similarity score 412. Calculation of similarities between vectors as described herein may be based on a variety of techniques including without limitation, cosine similarity, Manhattan distance, Euclidean distance, etc. The similarity score 412 and the label 406 corresponding to the context-response pair are input to a loss calculation component 435. The loss calculation component 435 implements a loss-function that optimizes the model as determined errors are back-propagated through the model as the model is trained.

Figure 5:
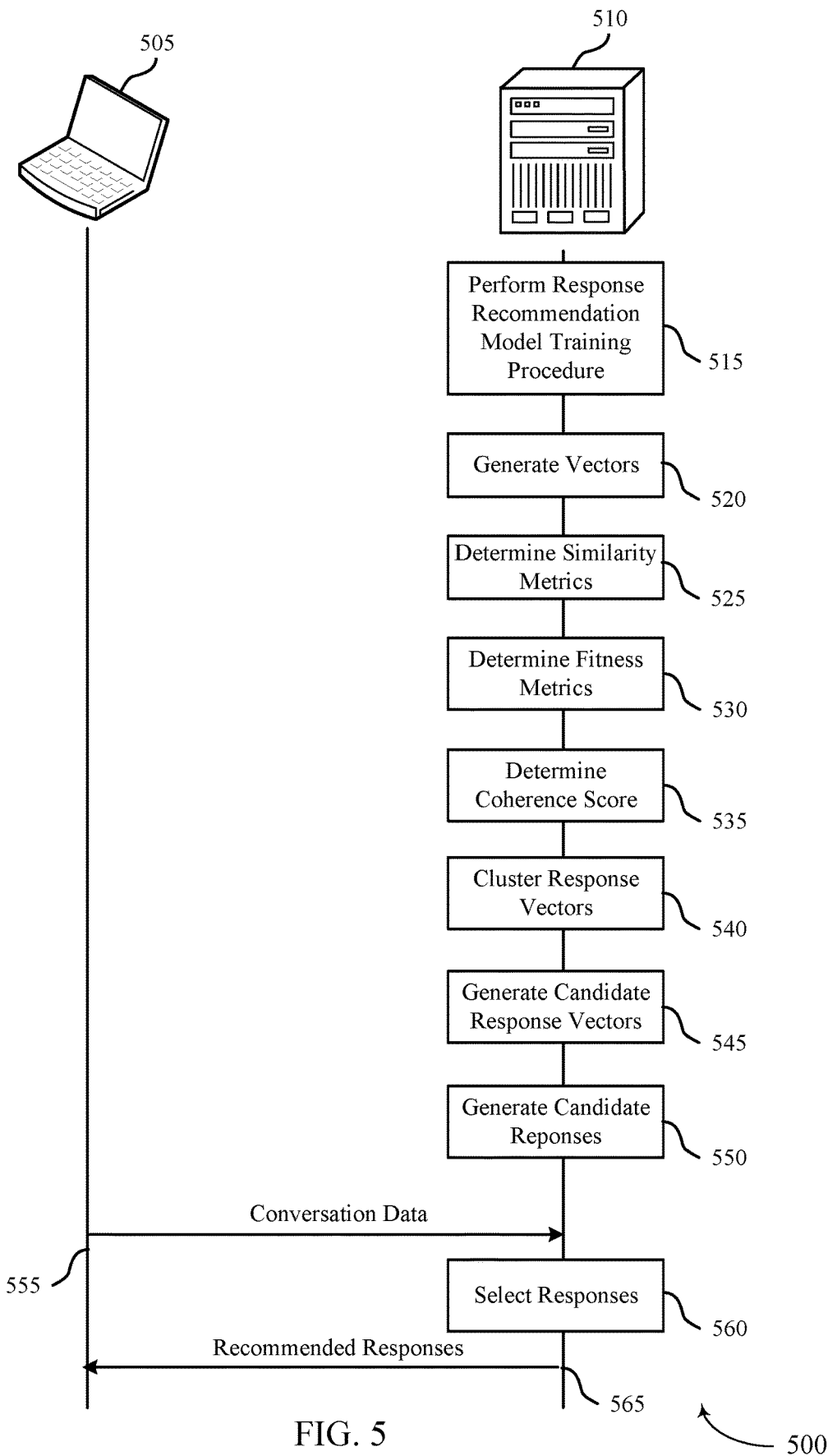
FIG. 5 illustrates an example of a process flow diagram that supports identification of response list in accordance with aspects of the present disclosure.

FIG. 5 illustrates an example of a process flow diagram 500 that supports identification of response list in accordance with aspects of the present disclosure. The process flow diagram 500 includes a device 505, which may be an example of a cloud client 105 of FIG. 1, and a data processing system 510, which may be an example of the response identification model 210 of FIG. 2.

At 515, the data processing system 510 performs model training procedure as described with respect to FIG. 4 using a corpus of conversation data. The training procedure may generate the context word embedding function and the response word embedding function.

At 520, the data processing system 510 may generate, from the corpus of conversation data including sequences of inputs corresponding to conversation sessions, a set of context vectors and a set of response vectors. Each context vector of the set of context vectors is generated based at least in part on a context comprising a sequence of inputs in a conversation session, and each response vector is generated based at least in part on a response comprising a subsequent input after a respective context and by an agent participating in the conversation session. As such each response vector of the set of response vectors is initially associated with a respective context vector of the set of context vectors. The vectors may be generated using the respective word embedding functions.

At 525, the data processing system 510 may determine, for each response vector, a set of similarity metrics. Each similarity metric corresponds to one response vector from a set of every other response vector and is determined based at least in part on a comparison of said response vector to the corresponding response vector. The set of similarity metrics may include a binary matrix. In some cases, the similarity metrics are determined using cosine similarity.

At 530, the data processing system 510 may determine, for each response vector, a set of fitness metrics. Each fitness metric may correspond to one response vector from the set of response vectors and is determined based at least in part on a probability prediction that said response vector corresponds to the corresponding context vector. The probability predict may be based on a likelihood that a model would select the particular response based on the context. In some cases, the set of fitness metrics includes a binary vector.

At 535, the data processing system 510 may determine, for each response vector, a coherence score. Each coherence score may be based at least in part on the set of similarity metrics and the set of fitness metrics for said response vector. In some cases, the coherence score is a mutual information function.

At 540, the data processing system 510 may cluster the response vectors from the set of response vectors based at least in part on similarities (e.g., distances) between each response vector of the set of response vectors to generate a set of clusters of response vectors. In some cases, the similarities may be determined using a cosine distance.

At 545, the data processing system 510 may generate a set of candidate response vectors by identifying, from each cluster of the set of clusters, one or more response vectors based at least in part on the coherence score associated with each response vector. For example, the data processing system 510 may identify the top (e.g., one or more) coherence scores and the corresponding response vectors.

At 550, the data processing system 510 may identify the set of candidate responses based on the generated set of candidate response vectors.

Figure 6:
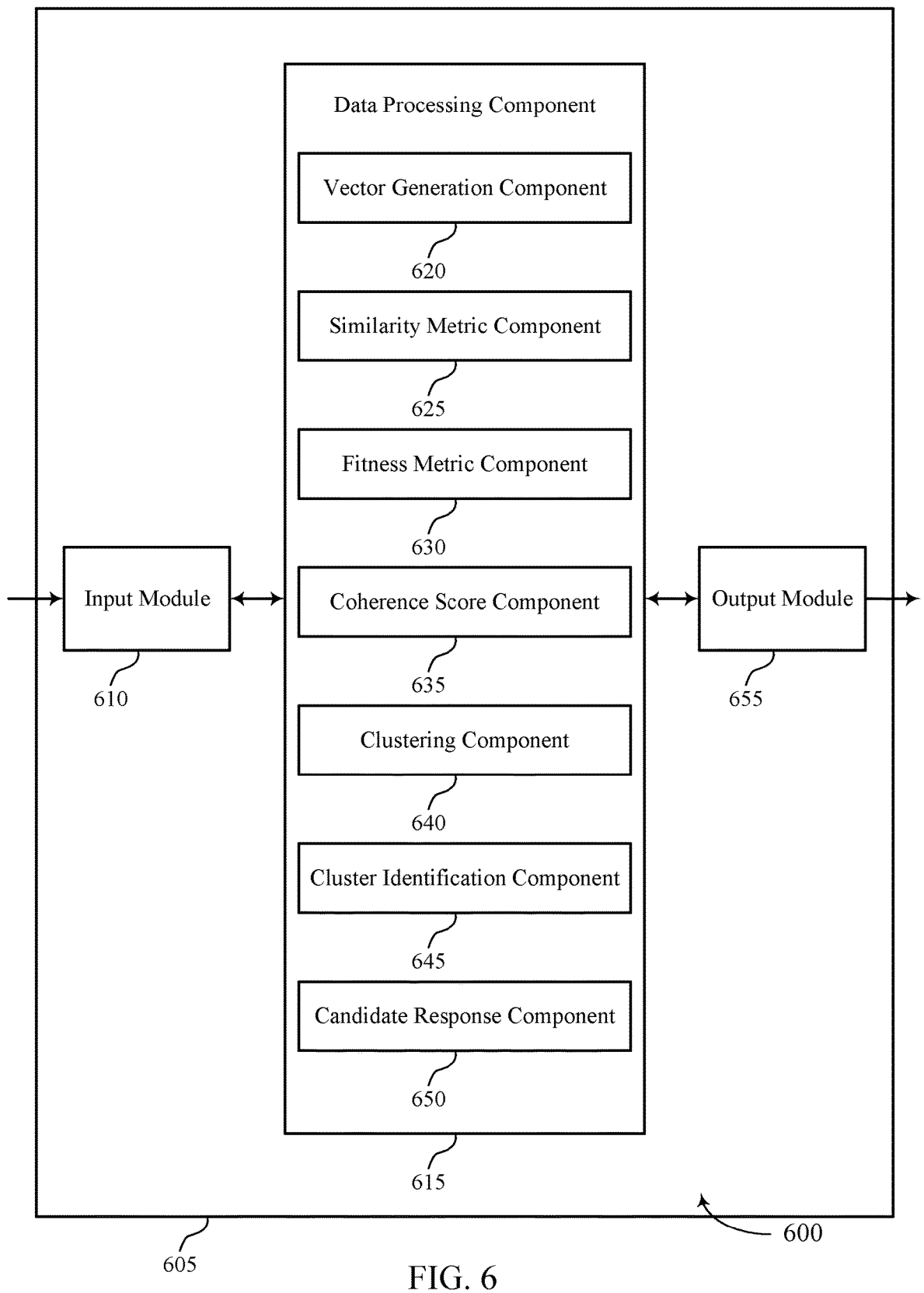
FIG. 6 shows a block diagram of an apparatus that supports identification of response list in accordance with aspects of the present disclosure.

At 555, the data processing system 510 may receive live conversation data representing a context of the conversation from the device 505. The data processing system 510 may select a set of responses form the set of candidate responses by generating a context vector based on the received conversation data, comparing the context vector to the response vectors corresponding to the set of candidate responses, and identify one or more close (e.g., cosine distance) responses based on the comparison. At 565, the data processing system 510 transmits an indication of the selected responses to the device FIG. 6 shows a block diagram 600 of an apparatus 605 that supports identification of response list in accordance with aspects of the present disclosure. The apparatus 605 may include an input module 610, a data processing component 615, and an output module 655. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data processing component 615 to support identification of response list. In some cases, the input module 610 may be a component of an input/output (I/O) controller 815 as described with reference to FIG. 8.

The data processing component 615 may include a vector generation component 620, a similarity metric component 625, a fitness metric component 630, a coherence score component 635, a clustering component 640, a cluster identification component 645, and a candidate response component 650. The data processing component 615 may be an example of aspects of the data processing component 705 or 810 described with reference to FIGS. 7 and 8.

The data processing component 615 and/or at least some of its various sub-components may be implemented in hardware, software executed by a processor, firmware, or any combination thereof. If implemented in software executed by a processor, the functions of the data processing component 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing component 615 and/or at least some of its various sub-components may be physically located at various positions, including being distributed such that portions of functions are implemented at different physical locations by one or more physical devices. In some examples, the data processing component 615 and/or at least some of its various sub-components may be a separate and distinct component in accordance with various aspects of the present disclosure. In other examples, the data processing component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The vector generation component 620 may generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors.

The similarity metric component 625 may for each response vector, determining a set of similarity metrics, where each similarity metric corresponds to one response vector from a set of every other response vector and is determined based on a comparison of said response vector to the corresponding response vector.

The fitness metric component 630 may for each response vector, determining a set of fitness metrics, where each fitness metric corresponds to one response vector from the set of response vectors and is determined based on a probability prediction that said response vector corresponds to the corresponding context vector.

The coherence score component 635 may for each response vector, determining a coherence score, where each coherence score is based on the set of similarity metrics and the set of fitness metrics for said response vector.

The clustering component 640 may cluster the response vectors from the set of response vectors based on similarities between each response vector of the set of response vectors to generate a set of clusters of response vectors.

The cluster identification component 645 may generate a set of candidate response vectors by identifying, from each cluster of the set of clusters, one or more response vectors based on the coherence score associated with each response vector.

The candidate response component 650 may identify the set of candidate responses based on the generated set of candidate response vectors.

The output module 655 may manage output signals for the apparatus 605. For example, the output module 655 may receive signals from other components of the apparatus 605, such as the data processing component 615, and may transmit these signals to other components or devices. In some specific examples, the output module 655 may transmit output signals for display in a user interface, for storage in a database or data store, for further processing at a server or server cluster, or for any other processes at any number of devices or systems. In some cases, the output module 655 may be a component of an I/O controller 815 as described with reference to FIG. 8.

Figure 7:
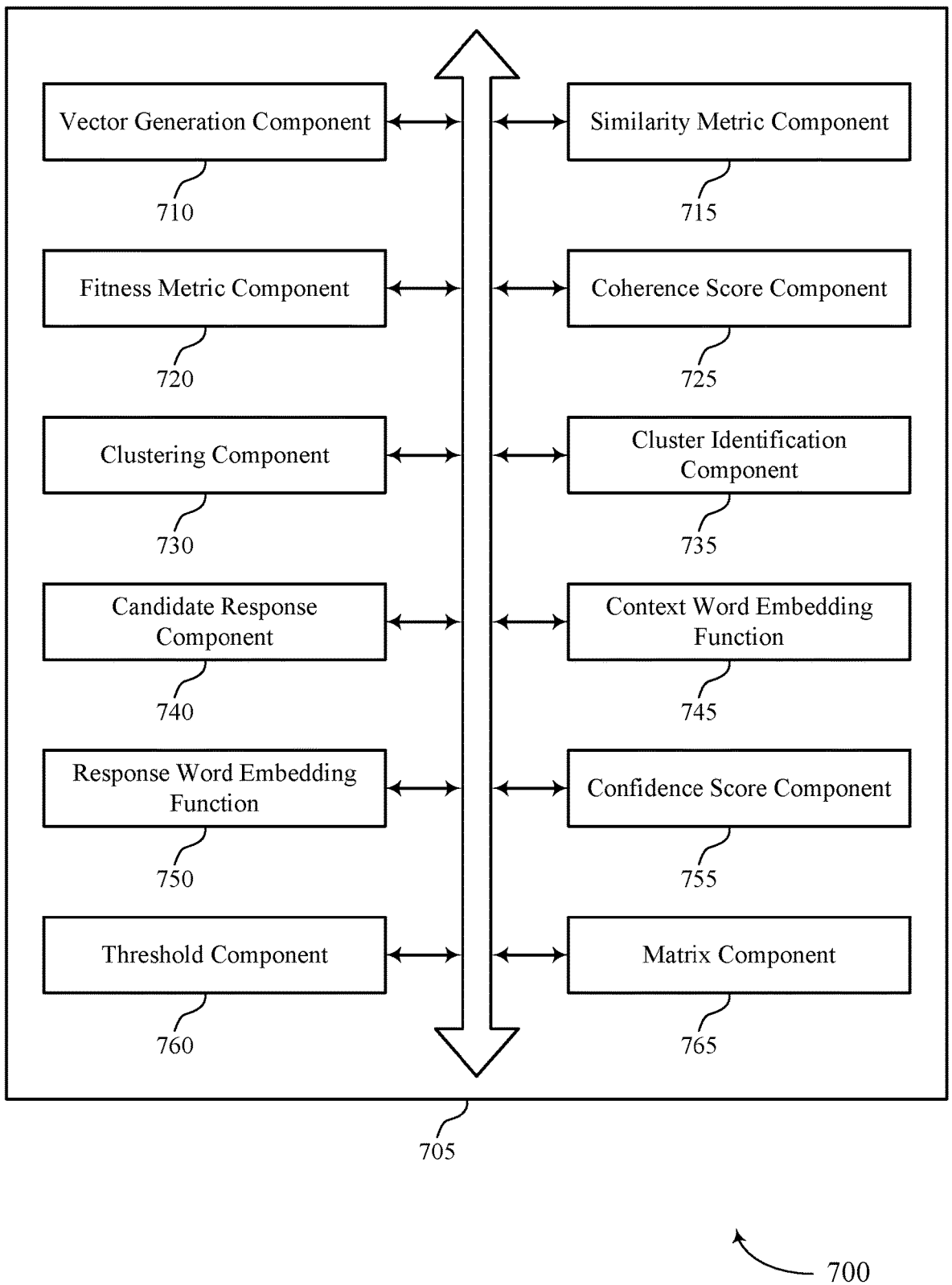
FIG. 7 shows a block diagram of a data processing component that supports identification of response list in accordance with aspects of the present disclosure.

FIG. 7 shows a block diagram 700 of a data processing component 705 that supports identification of response list in accordance with aspects of the present disclosure. The data processing component 705 may be an example of aspects of a data processing component 615 or a data processing component 810 described herein. The data processing component 705 may include a vector generation component 710, a similarity metric component 715, a fitness metric component 720, a coherence score component 725, a clustering component 730, a cluster identification component 735, a candidate response component 740, a context word embedding function 745, a response word embedding function 750, a confidence score component 755, a threshold component 760, and a matrix component 765. Each of these modules may communicate, directly or indirectly, with one another (e.g., via one or more buses).

The vector generation component 710 may generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors.

The similarity metric component 715 may for each response vector, determining a set of similarity metrics, where each similarity metric corresponds to one response vector from a set of every other response vector and is determined based on a comparison of said response vector to the corresponding response vector.

In some examples, the similarity metric component 715 may compare said response vector to each response vector of the set of every other response vector to determine the set of similarity metrics.

In some examples, the similarity metric component 715 may determine a cosine similarity between said response vector and each response vector of the set of every other response vectors to perform the comparing.

In some cases, the set of similarity metrics for each response vector includes a binary vector, where each element of the binary vector indicates whether the similarity metric between said response vector and one of the set of every other response vectors is above a similarity threshold.

The fitness metric component 720 may for each response vector, determining a set of fitness metrics, where each fitness metric corresponds to one response vector from the set of response vectors and is determined based on a probability prediction that said response vector corresponds to the corresponding context vector.

In some cases, the set of fitness metrics for each response vector includes a binary vector, where each element of the binary vector indicates whether the probability prediction of said response vector corresponds to the corresponding context vector is above a probability threshold.

The coherence score component 725 may for each response vector, determining a coherence score, where each coherence score is based on the set of similarity metrics and the set of fitness metrics for said response vector.

In some examples, the coherence score component 725 may apply a mutual information function to the set of similarity metrics for said response vector and the set of fitness metrics for said response vector to determine the coherence score for said response vectors.

The clustering component 730 may cluster the response vectors from the set of response vectors based on similarities between each response vector of the set of response vectors to generate a set of clusters of response vectors.

In some examples, the clustering component 730 may apply a density-based spatial clustering of applications with noise process to the set of response vectors to cluster the set of response vectors.

The cluster identification component 735 may generate a set of candidate response vectors by identifying, from each cluster of the set of clusters, one or more response vectors based on the coherence score associated with each response vector.

The candidate response component 740 may identify the set of candidate responses based on the generated set of candidate response vectors.

The context word embedding function 745 may generate each context vector of the set of context vectors using a context word embedding function trained on the corpus of conversation data.

The response word embedding function 750 may generate each response vector of the set of response vectors using a response word embedding function trained on the corpus of conversation data.

The confidence score component 755 may generate, for each response vector, a confidence score based on said response vector and the associated respective context vector.

The threshold component 760 may identify, a set of response vector context vector pairs having the confidence score greater than a confidence score threshold, where the coherence score is determined for each response vector of the set of response vector context vector pairs.

The matrix component 765 may generate a matrix of response vectors and a matrix of context vectors, where each row of the response vector is associated with a respective row of the matrix of context vectors based on the corpus of conversation data.

In some cases, the set of fitness metrics for each response are determined using the matrix of response vectors and the matrix of context vectors.

In some cases, the set of similarity metrics for each response are determined using the matrix of response vectors.

Figure 8:
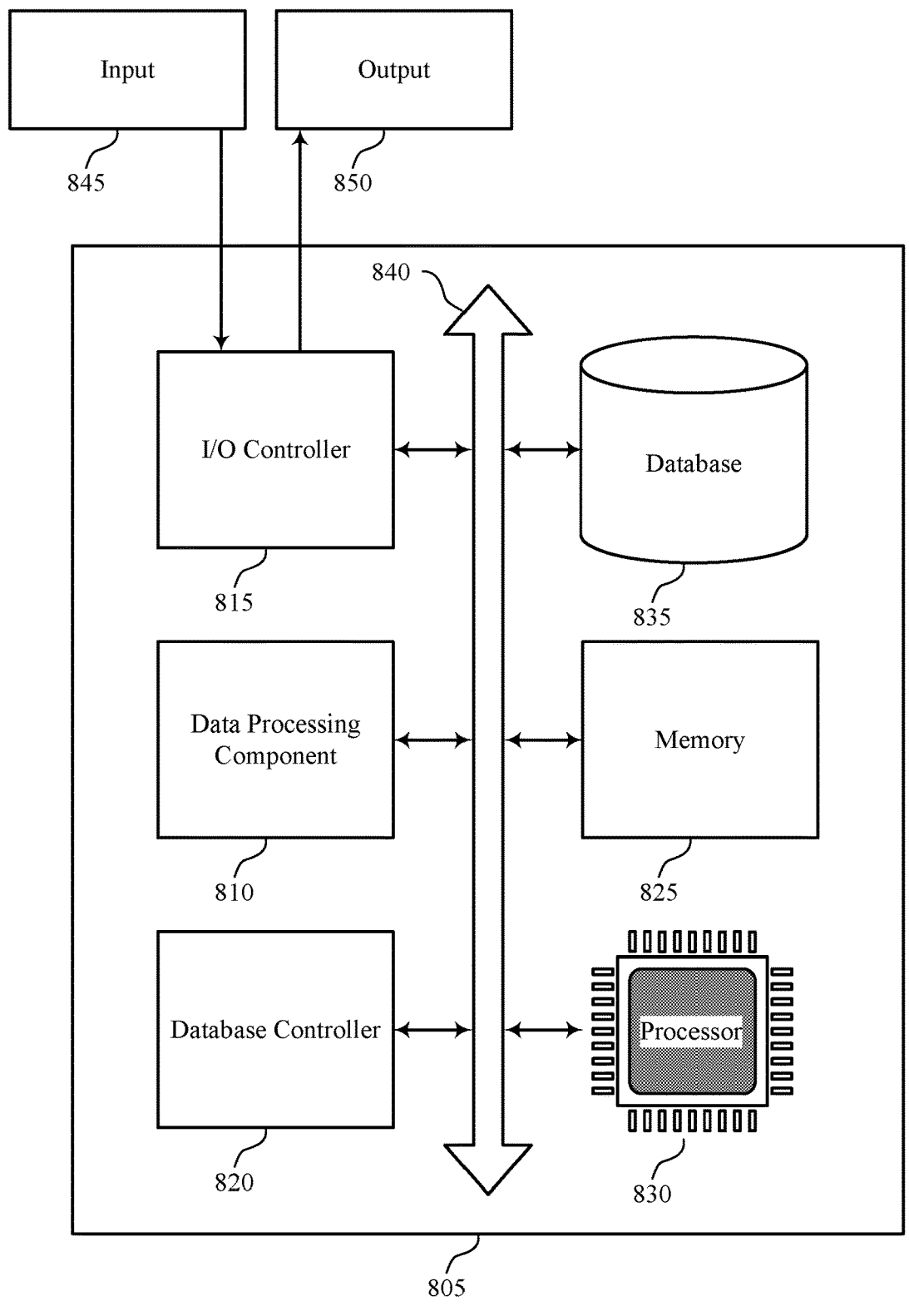
FIG. 8 shows a diagram of a system including a device that supports identification of response list in accordance with aspects of the present disclosure.

FIG. 8 shows a diagram of a system 800 including a device 805 that supports identification of response list in accordance with aspects of the present disclosure. The device 805 may be an example of or include the components of an analytical data store or an apparatus 605 as described herein. The device 805 may include components for bi-directional data communications including components for transmitting and receiving communications, including a data processing component 810, an I/O controller 815, a database controller 820, memory 825, a processor 830, and a database 835. These components may be in electronic communication via one or more buses (e.g., bus 840).

The data processing component 810 may be an example of a data processing component 615 or 705 as described herein. For example, the data processing component 810 may perform any of the methods or processes described above with reference to FIGS. 6 and 7. In some cases, the data processing component 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting identification of response list).

Figure 9:
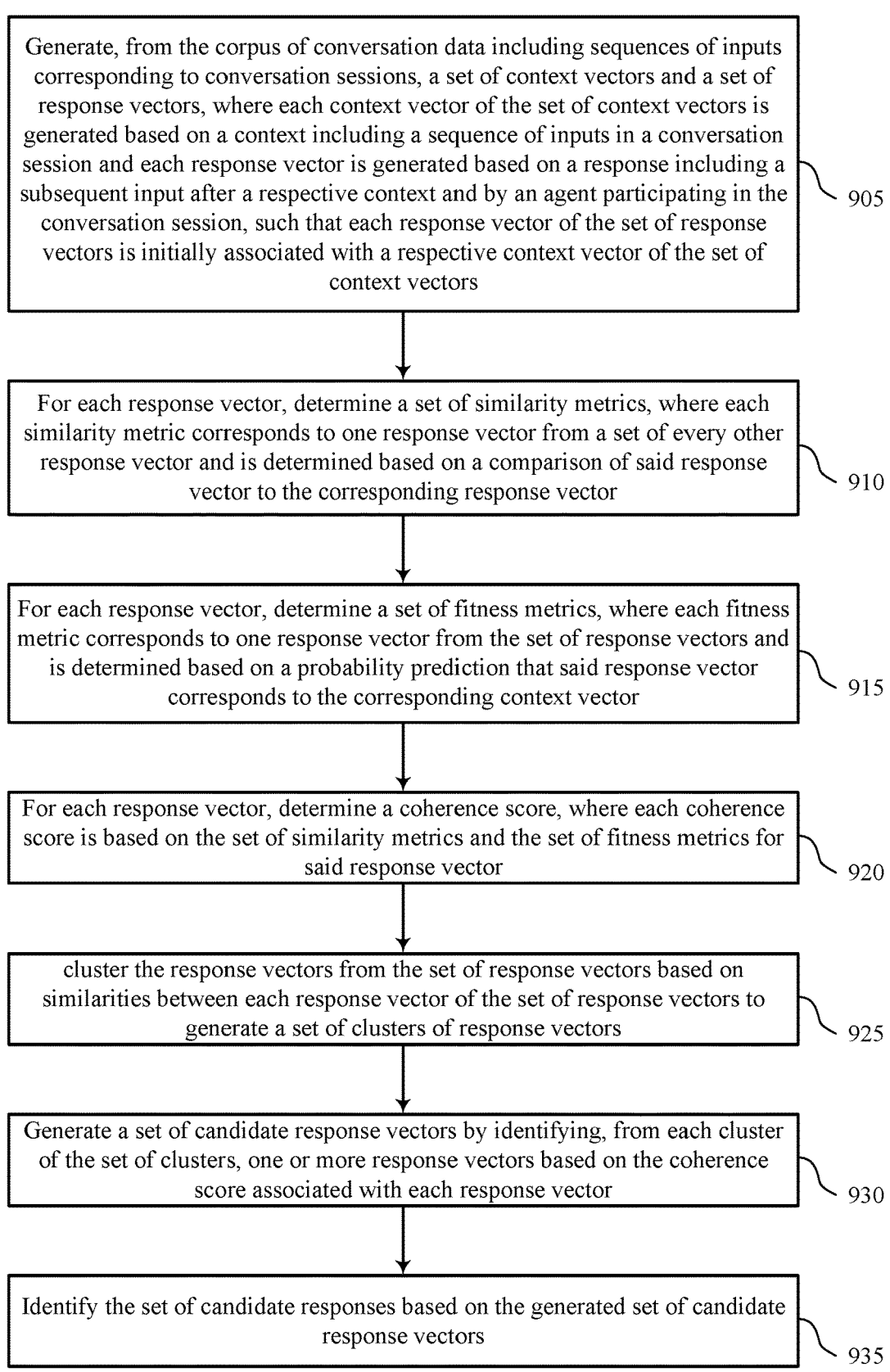
FIGS. 9 through 11 show flowcharts illustrating methods that support identification of response list in accordance with aspects of the present disclosure.

FIG. 9 shows a flowchart illustrating a method 900 that supports identification of response list in accordance with aspects of the present disclosure. The operations of method 900 may be implemented by an analytical data store or its components as described herein. For example, the operations of method 900 may be performed by a data processing component as described with reference to FIGS. 6 through 8. In some examples, an analytical data store may execute a set of instructions to control the functional elements of the analytical data store to perform the functions described below. Additionally or alternatively, an analytical data store may perform aspects of the functions described below using special-purpose hardware.

At 905, the analytical data store may generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors. The operations of 905 may be performed according to the methods described herein. In some examples, aspects of the operations of 905 may be performed by a vector generation component as described with reference to FIGS. 6 through 8.

At 910, the analytical data store may for each response vector, determining a set of similarity metrics, where each similarity metric corresponds to one response vector from a set of every other response vector and is determined based on a comparison of said response vector to the corresponding response vector. The operations of 910 may be performed according to the methods described herein. In some examples, aspects of the operations of 910 may be performed by a similarity metric component as described with reference to FIGS. 6 through 8.

At 915, the analytical data store may for each response vector, determining a set of fitness metrics, where each fitness metric corresponds to one response vector from the set of response vectors and is determined based on a probability prediction that said response vector corresponds to the corresponding context vector. The operations of 915 may be performed according to the methods described herein. In some examples, aspects of the operations of 915 may be performed by a fitness metric component as described with reference to FIGS. 6 through 8.

At 920, the analytical data store may for each response vector, determining a coherence score, where each coherence score is based on the set of similarity metrics and the set of fitness metrics for said response vector. The operations of 920 may be performed according to the methods described herein. In some examples, aspects of the operations of 920 may be performed by a coherence score component as described with reference to FIGS. 6 through 8.

At 925, the analytical data store may cluster the response vectors from the set of response vectors based on similarities between each response vector of the set of response vectors to generate a set of clusters of response vectors. The operations of 925 may be performed according to the methods described herein. In some examples, aspects of the operations of 925 may be performed by a clustering component as described with reference to FIGS. 6 through 8.

At 930, the analytical data store may generate a set of candidate response vectors by identifying, from each cluster of the set of clusters, one or more response vectors based on the coherence score associated with each response vector. The operations of 930 may be performed according to the methods described herein. In some examples, aspects of the operations of 930 may be performed by a cluster identification component as described with reference to FIGS. 6 through 8.

At 935, the analytical data store may identify the set of candidate responses based on the generated set of candidate response vectors. The operations of 935 may be performed according to the methods described herein. In some examples, aspects of the operations of 935 may be performed by a candidate response component as described with reference to FIGS. 6 through 8.

Figure 10:
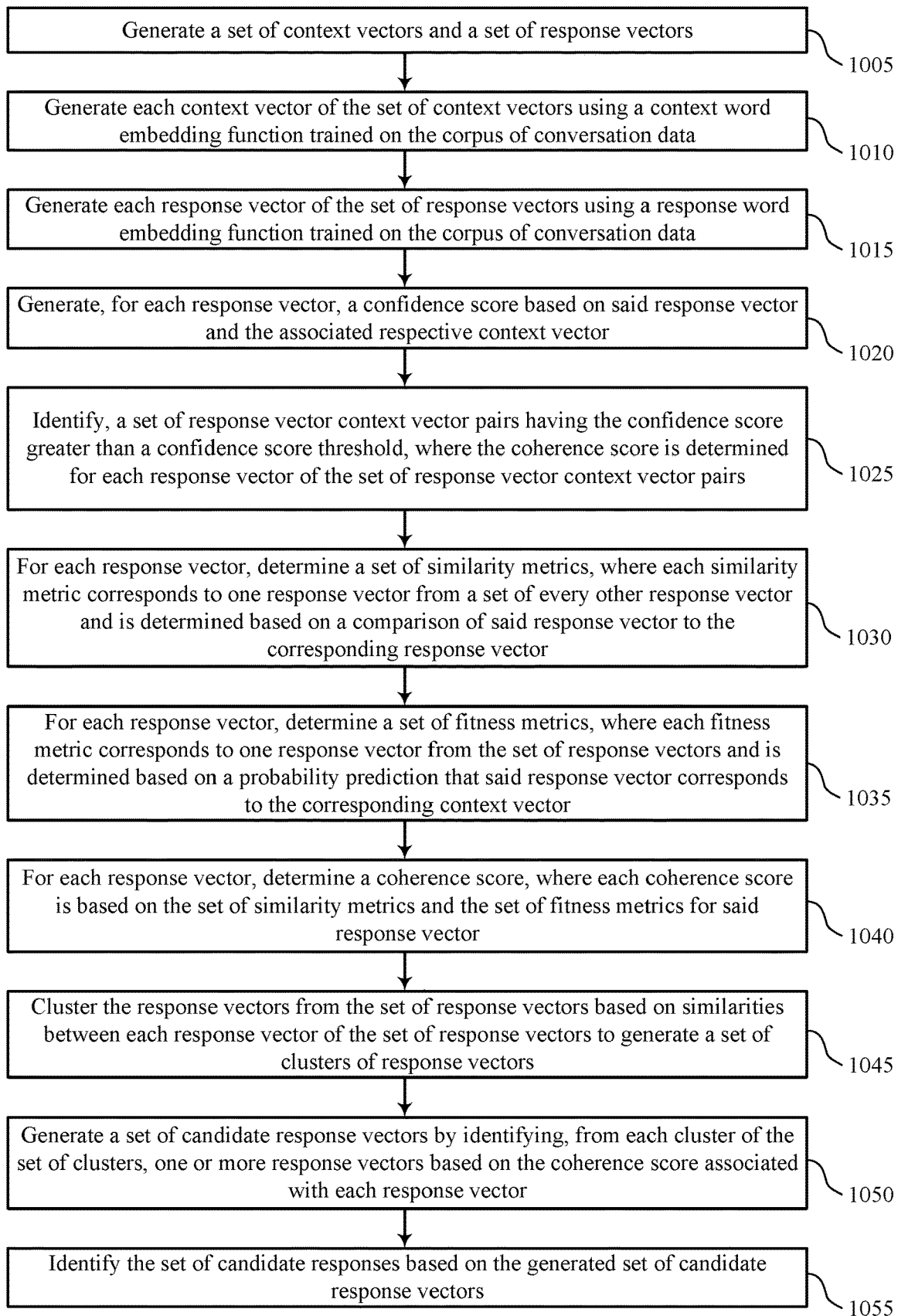

FIG. 10 shows a flowchart illustrating a method 1000 that supports identification of response list in accordance with aspects of the present disclosure. The operations of method 1000 may be implemented by an analytical data store or its components as described herein. For example, the operations of method 1000 may be performed by a data processing component as described with reference to FIGS. 6 through 8. In some examples, an analytical data store may execute a set of instructions to control the functional elements of the analytical data store to perform the functions described below. Additionally or alternatively, an analytical data store may perform aspects of the functions described below using special-purpose hardware.

At 1005, the analytical data store may generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors. The operations of 1005 may be performed according to the methods described herein. In some examples, aspects of the operations of 1005 may be performed by a vector generation component as described with reference to FIGS. 6 through 8.

At 1010, the analytical data store may generate each context vector of the set of context vectors using a context word embedding function trained on the corpus of conversation data. The operations of 1010 may be performed according to the methods described herein. In some examples, aspects of the operations of 1010 may be performed by a context word embedding function as described with reference to FIGS. 6 through 8.

At 1015, the analytical data store may generate each response vector of the set of response vectors using a response word embedding function trained on the corpus of conversation data. The operations of 1015 may be performed according to the methods described herein. In some examples, aspects of the operations of 1015 may be performed by a response word embedding function as described with reference to FIGS. 6 through 8.

At 1020, the analytical data store may generate, for each response vector, a confidence score based on said response vector and the associated respective context vector. The operations of 1020 may be performed according to the methods described herein. In some examples, aspects of the operations of 1020 may be performed by a confidence score component as described with reference to FIGS. 6 through 8.

At 1025, the analytical data store may identify, a set of response vector context vector pairs having the confidence score greater than a confidence score threshold, where the coherence score is determined for each response vector of the set of response vector context vector pairs. The operations of 1025 may be performed according to the methods described herein. In some examples, aspects of the operations of 1025 may be performed by a threshold component as described with reference to FIGS. 6 through 8.

At 1030, the analytical data store may for each response vector, determining a set of similarity metrics, where each similarity metric corresponds to one response vector from a set of every other response vector and is determined based on a comparison of said response vector to the corresponding response vector. The operations of 1030 may be performed according to the methods described herein. In some examples, aspects of the operations of 1030 may be performed by a similarity metric component as described with reference to FIGS. 6 through 8.

At 1035, the analytical data store may for each response vector, determining a set of fitness metrics, where each fitness metric corresponds to one response vector from the set of response vectors and is determined based on a probability prediction that said response vector corresponds to the corresponding context vector. The operations of 1035 may be performed according to the methods described herein. In some examples, aspects of the operations of 1035 may be performed by a fitness metric component as described with reference to FIGS. 6 through 8.

At 1040, the analytical data store may for each response vector, determining a coherence score, where each coherence score is based on the set of similarity metrics and the set of fitness metrics for said response vector. The operations of 1040 may be performed according to the methods described herein. In some examples, aspects of the operations of 1040 may be performed by a coherence score component as described with reference to FIGS. 6 through 8.

At 1045, the analytical data store may cluster the response vectors from the set of response vectors based on similarities between each response vector of the set of response vectors to generate a set of clusters of response vectors. The operations of 1045 may be performed according to the methods described herein. In some examples, aspects of the operations of 1045 may be performed by a clustering component as described with reference to FIGS. 6 through 8.

At 1050, the analytical data store may generate a set of candidate response vectors by identifying, from each cluster of the set of clusters, one or more response vectors based on the coherence score associated with each response vector. The operations of 1050 may be performed according to the methods described herein. In some examples, aspects of the operations of 1050 may be performed by a cluster identification component as described with reference to FIGS. 6 through 8.

At 1055, the analytical data store may identify the set of candidate responses based on the generated set of candidate response vectors. The operations of 1055 may be performed according to the methods described herein. In some examples, aspects of the operations of 1055 may be performed by a candidate response component as described with reference to FIGS. 6 through 8.

Figure 11:
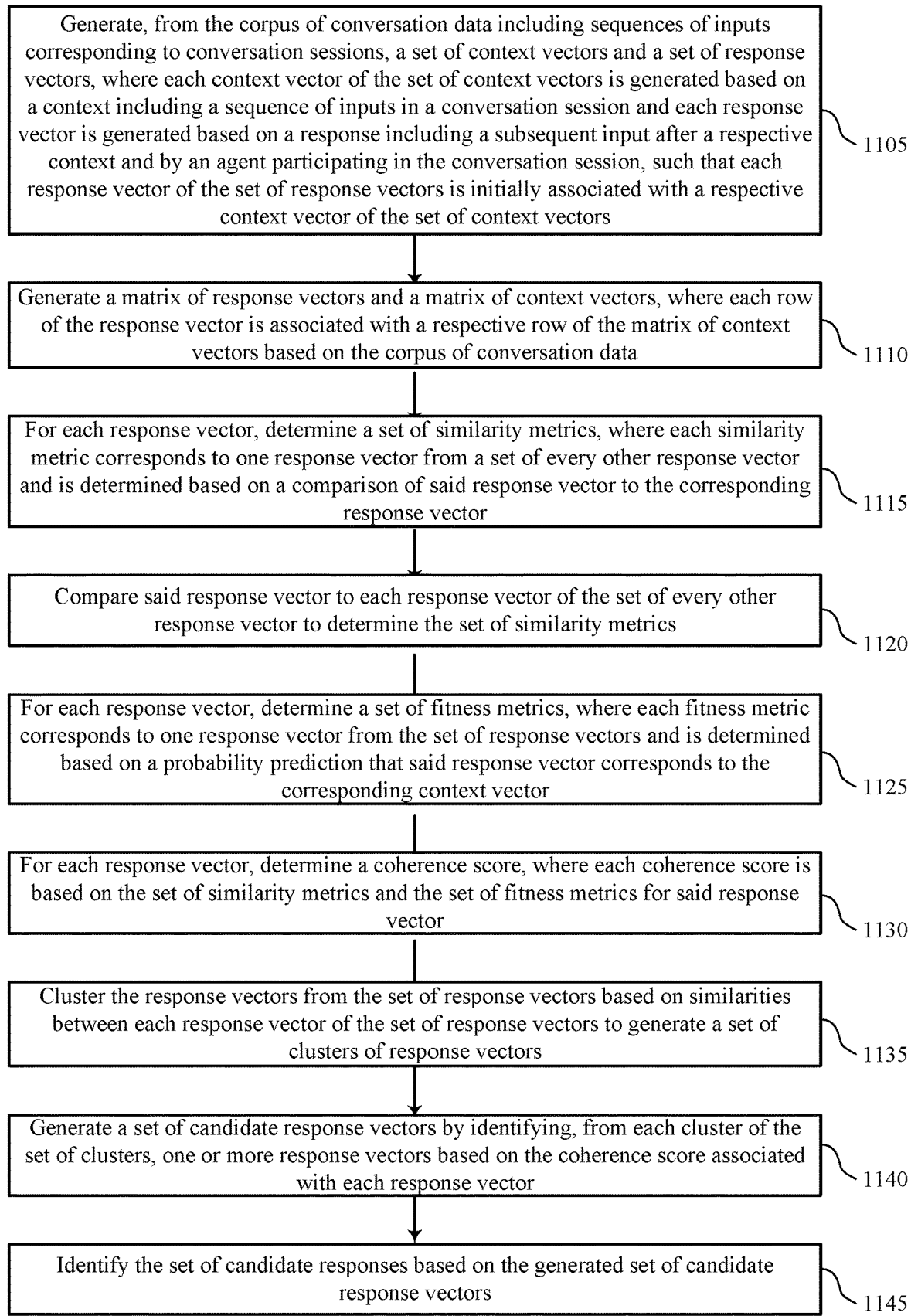

FIG. 11 shows a flowchart illustrating a method 1100 that supports identification of response list in accordance with aspects of the present disclosure. The operations of method 1100 may be implemented by an analytical data store or its components as described herein. For example, the operations of method 1100 may be performed by a data processing component as described with reference to FIGS. 6 through 8. In some examples, an analytical data store may execute a set of instructions to control the functional elements of the analytical data store to perform the functions described below. Additionally or alternatively, an analytical data store may perform aspects of the functions described below using special-purpose hardware.

At 1105, the analytical data store may generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors. The operations of 1105 may be performed according to the methods described herein. In some examples, aspects of the operations of 1105 may be performed by a vector generation component as described with reference to FIGS. 6 through 8.

At 1110, the analytical data store may generate a matrix of response vectors and a matrix of context vectors, where each row of the response vector is associated with a respective row of the matrix of context vectors based on the corpus of conversation data. The operations of 1110 may be performed according to the methods described herein. In some examples, aspects of the operations of 1110 may be performed by a matrix component as described with reference to FIGS. 6 through 8.

At 1115, the analytical data store may for each response vector, determining a set of similarity metrics, where each similarity metric corresponds to one response vector from a set of every other response vector and is determined based on a comparison of said response vector to the corresponding response vector. The operations of 1115 may be performed according to the methods described herein. In some examples, aspects of the operations of 1115 may be performed by a similarity metric component as described with reference to FIGS. 6 through 8.

At 1120, the analytical data store may compare said response vector to each response vector of the set of every other response vector to determine the set of similarity metrics. The operations of 1120 may be performed according to the methods described herein. In some examples, aspects of the operations of 1120 may be performed by a similarity metric component as described with reference to FIGS. 6 through 8.

At 1125, the analytical data store may for each response vector, determining a set of fitness metrics, where each fitness metric corresponds to one response vector from the set of response vectors and is determined based on a probability prediction that said response vector corresponds to the corresponding context vector. The operations of 1125 may be performed according to the methods described herein. In some examples, aspects of the operations of 1125 may be performed by a fitness metric component as described with reference to FIGS. 6 through 8.

At 1130, the analytical data store may for each response vector, determining a coherence score, where each coherence score is based on the set of similarity metrics and the set of fitness metrics for said response vector. The operations of 1130 may be performed according to the methods described herein. In some examples, aspects of the operations of 1130 may be performed by a coherence score component as described with reference to FIGS. 6 through 8.

At 1135, the analytical data store may cluster the response vectors from the set of response vectors based on similarities between each response vector of the set of response vectors to generate a set of clusters of response vectors. The operations of 1135 may be performed according to the methods described herein. In some examples, aspects of the operations of 1135 may be performed by a clustering component as described with reference to FIGS. 6 through 8.

At 1140, the analytical data store may generate a set of candidate response vectors by identifying, from each cluster of the set of clusters, one or more response vectors based on the coherence score associated with each response vector. The operations of 1140 may be performed according to the methods described herein. In some examples, aspects of the operations of 1140 may be performed by a cluster identification component as described with reference to FIGS. 6 through 8.

At 1145, the analytical data store may identify the set of candidate responses based on the generated set of candidate response vectors. The operations of 1145 may be performed according to the methods described herein. In some examples, aspects of the operations of 1145 may be performed by a candidate response component as described with reference to FIGS. 6 through 8.

A method of processing a corpus of conversation data to automatically generate a set of candidate responses corresponding to contexts extracted from the conversation data is described. The method may include generating, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors, for each response vector, determining a set of similarity metrics, where each similarity metric corresponds to one response vector from a set of every other response vector and is determined based on a comparison of said response vector to the corresponding response vector, for each response vector, determining a set of fitness metrics, where each fitness metric corresponds to one response vector from the set of response vectors and is determined based on a probability prediction that said response vector corresponds to the corresponding context vector, for each response vector, determining a coherence score, where each coherence score is based on the set of similarity metrics and the set of fitness metrics for said response vector, clustering the response vectors from the set of response vectors based on similarities between each response vector of the set of response vectors to generate a set of clusters of response vectors, generating a set of candidate response vectors by identifying, from each cluster of the set of clusters, one or more response vectors based on the coherence score associated with each response vector, and identifying the set of candidate responses based on the generated set of candidate response vectors.

An apparatus for processing a corpus of conversation data to automatically generate a set of candidate responses corresponding to contexts extracted from the conversation data is described. The apparatus may include a processor, memory coupled with the processor, and instructions stored in the memory. The instructions may be executable by the processor to cause the apparatus to generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors, for each response vector, determining a set of similarity metrics, where each similarity metric corresponds to one response vector from a set of every other response vector and is determined based on a comparison of said response vector to the corresponding response vector, for each response vector, determining a set of fitness metrics, where each fitness metric corresponds to one response vector from the set of response vectors and is determined based on a probability prediction that said response vector corresponds to the corresponding context vector, for each response vector, determining a coherence score, where each coherence score is based on the set of similarity metrics and the set of fitness metrics for said response vector, cluster the response vectors from the set of response vectors based on similarities between each response vector of the set of response vectors to generate a set of clusters of response vectors, generate a set of candidate response vectors by identifying, from each cluster of the set of clusters, one or more response vectors based on the coherence score associated with each response vector, and identify the set of candidate responses based on the generated set of candidate response vectors.

Another apparatus for processing a corpus of conversation data to automatically generate a set of candidate responses corresponding to contexts extracted from the conversation data is described. The apparatus may include means for generating, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors, for each response vector, determining a set of similarity metrics, where each similarity metric corresponds to one response vector from a set of every other response vector and is determined based on a comparison of said response vector to the corresponding response vector, for each response vector, determining a set of fitness metrics, where each fitness metric corresponds to one response vector from the set of response vectors and is determined based on a probability prediction that said response vector corresponds to the corresponding context vector, for each response vector, determining a coherence score, where each coherence score is based on the set of similarity metrics and the set of fitness metrics for said response vector, clustering the response vectors from the set of response vectors based on similarities between each response vector of the set of response vectors to generate a set of clusters of response vectors, generating a set of candidate response vectors by identifying, from each cluster of the set of clusters, one or more response vectors based on the coherence score associated with each response vector, and identifying the set of candidate responses based on the generated set of candidate response vectors.

A non-transitory computer-readable medium storing code for processing a corpus of conversation data to automatically generate a set of candidate responses corresponding to contexts extracted from the conversation data is described. The code may include instructions executable by a processor to generate, from the corpus of conversation data including sequences of inputs corresponding to conversation sessions, a set of context vectors and a set of response vectors, where each context vector of the set of context vectors is generated based on a context including a sequence of inputs in a conversation session and each response vector is generated based on a response including a subsequent input after a respective context and by an agent participating in the conversation session, such that each response vector of the set of response vectors is initially associated with a respective context vector of the set of context vectors, for each response vector, determining a set of similarity metrics, where each similarity metric corresponds to one response vector from a set of every other response vector and is determined based on a comparison of said response vector to the corresponding response vector, for each response vector, determining a set of fitness metrics, where each fitness metric corresponds to one response vector from the set of response vectors and is determined based on a probability prediction that said response vector corresponds to the corresponding context vector, for each response vector, determining a coherence score, where each coherence score is based on the set of similarity metrics and the set of fitness metrics for said response vector, cluster the response vectors from the set of response vectors based on similarities between each response vector of the set of response vectors to generate a set of clusters of response vectors, generate a set of candidate response vectors by identifying, from each cluster of the set of clusters, one or more response vectors based on the coherence score associated with each response vector, and identify the set of candidate responses based on the generated set of candidate response vectors.

Some examples of the method, apparatuses, and non-transitory computer-readable medium described herein may further include operations, features, means, or instructions for generating each context vector of the set of context vectors using a context word embedding function trained on the corpus of conversation data.

Some examples of the method, apparatuses, and non-transitory computer-readable medium described herein may further include operations, features, means, or instructions for generating each response vector of the set of response vectors using a response word embedding function trained on the corpus of conversation data.

Some examples of the method, apparatuses, and non-transitory computer-readable medium described herein may further include operations, features, means, or instructions for generating, for each response vector, a confidence score based on said response vector and the associated respective context vector, and identifying, a set of response vector context vector pairs having the confidence score greater than a confidence score threshold, where the coherence score may be determined for each response vector of the set of response vector context vector pairs.

Some examples of the method, apparatuses, and non-transitory computer-readable medium described herein may further include operations, features, means, or instructions for generating a matrix of response vectors and a matrix of context vectors, where each row of the response vector may be associated with a respective row of the matrix of context vectors based on the corpus of conversation data.

In some examples of the method, apparatuses, and non-transitory computer-readable medium described herein, the set of fitness metrics for each response may be determined using the matrix of response vectors and the matrix of context vectors.

In some examples of the method, apparatuses, and non-transitory computer-readable medium described herein, the set of similarity metrics for each response may be determined using the matrix of response vectors.

Some examples of the method, apparatuses, and non-transitory computer-readable medium described herein may further include operations, features, means, or instructions for comparing said response vector to each response vector of the set of every other response vector to determine the set of similarity metrics.

Some examples of the method, apparatuses, and non-transitory computer-readable medium described herein may further include operations, features, means, or instructions for determining a cosine similarity between said response vector and each response vector of the set of every other response vectors to perform the comparing.

In some examples of the method, apparatuses, and non-transitory computer-readable medium described herein, the set of similarity metrics for each response vector includes a binary vector, where each element of the binary vector indicates whether the similarity metric between said response vector and one of the set of every other response vectors may be above a similarity threshold.

In some examples of the method, apparatuses, and non-transitory computer-readable medium described herein, the set of fitness metrics for each response vector includes a binary vector, where each element of the binary vector indicates whether the probability prediction of said response vector corresponds to the corresponding context vector may be above a probability threshold.

Some examples of the method, apparatuses, and non-transitory computer-readable medium described herein may further include operations, features, means, or instructions for applying a mutual information function to the set of similarity metrics for said response vector and the set of fitness metrics for said response vector to determine the coherence score for said response vectors.

Some examples of the method, apparatuses, and non-transitory computer-readable medium described herein may further include operations, features, means, or instructions for applying a density-based spatial clustering of applications with noise process to the set of response vectors to cluster the set of response vectors.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of processing a corpus of conversation data to automatically generate a set of candidate responses, comprising:

determining a set of similarity metrics for a response vector of a response matrix that comprises a plurality of response vectors by comparing the response vector to other response vectors in the response matrix, wherein the response vector is generated using a response comprising an input from the corpus of conversation data that is subsequent to a set of inputs in the corpus of conversation data comprising a context;

determining a set of fitness metrics for the response vector based at least in part on determining a probability that the response vector corresponds to a set of context vectors from a context matrix, wherein the set of context vectors is different from a context vector associated with the response vector and corresponding to the context in the corpus of conversation data;

determining a coherence score for the response vector based at least in part on the set of similarity metrics and the set of fitness metrics for the response vector;

determining a second set of similarity metrics, a second set of fitness metrics, and a second coherence score for one or more of the other response vectors from the response matrix;

clustering response vectors from the response matrix into a set of clusters based at least in part on similarities between the response vectors;

selecting a set of candidate response vectors from at least one cluster of the set of clusters based at least in part on coherence scores associated with response vectors in the at least one cluster; and identifying the set of candidate responses based at least in part on the selected set of candidate response vectors.

2. The method of claim 1, further comprising:

generating the context matrix using a context word embedding function trained on the corpus of conversation data.

3. The method of claim 1, further comprising:

generating the response matrix using a response word embedding function trained on the corpus of conversation data.

4. The method of claim 1, further comprising:

generating, for the response vector, a confidence score based at least in part on the response vector and the context vector corresponding to the response vector; and identifying a set of response vector context vector pairs having confidence scores greater than a confidence score threshold, wherein determining the coherence score for the response vector is based at least in part on identifying the set of response vector context vector pairs.

5. The method of claim 1, further comprising:

generating the response matrix and the context matrix, wherein rows of the response matrix are associated with respective rows of the context matrix based at least in part on the corpus of conversation data.

6. The method of claim 5, wherein the set of fitness metrics are determined using the response matrix and the context matrix.

7. The method of claim 5, wherein the set of similarity metrics are determined using the response matrix.

8. The method of claim 1, further comprising:

comparing the response vector to the other response vectors of the response matrix to determine the set of similarity metrics.

9. The method of claim 8, further comprising:

determining a cosine similarity between the response vector and the other response vectors of the response matrix to perform the comparing.

10. The method of claim 8, wherein the set of similarity metrics for the response vector comprises a binary vector, wherein an element of the binary vector indicates whether the similarity metric between the response vector and the other response vectors is above a similarity threshold.

11. The method of claim 1, wherein the set of fitness metrics for the response vector comprises a binary vector, wherein an element of the binary vector indicates whether the probability of the response vector corresponding to a context vector is above a probability threshold.

12. The method of claim 1, further comprising:

applying a mutual information function to the set of similarity metrics for the response vector and the set of fitness metrics for the response vector to determine the coherence score.

13. The method of claim 1, further comprising:

applying a density-based spatial clustering of applications with noise process to the response vectors to cluster the response vectors.

14. An apparatus for processing a corpus of conversation data to automatically generate a set of candidate responses, comprising:

a processor, memory coupled with the processor; and instructions stored in the memory and executable by the processor to cause the apparatus to:

determine a set of similarity metrics for a response vector of a response matrix that comprises a plurality of response vectors by comparing the response vector to other response vectors in the response matrix, wherein the response vector is generated using a response comprising an input from the corpus of conversation data that is subsequent to a set of inputs in the corpus of conversation data comprising a context;

determine a set of fitness metrics for the response vector based at least in part on determining a probability that the response vector corresponds to a set of context vectors from a context matrix, wherein the set of context vectors is different from a context vector associated with the response vector and corresponding to the context in the corpus of conversation data;

determine a coherence score for the response vector based at least in part on the set of similarity metrics and the set of fitness metrics for the response vector;

determine a second set of similarity metrics, a second set of fitness metrics, and a second coherence score for one or more of the other response vectors from the response matrix;

cluster response vectors from the response matrix into a set of clusters based at least in part on similarities between the response vectors;

select a set of candidate response vectors from at least one cluster of the set of clusters based at least in part on coherence scores associated with response vectors in the at least one cluster; and identify the set of candidate responses based at least in part on the selected set of candidate response vectors.

15. The apparatus of claim 14, wherein the instructions are further executable by the processor to cause the apparatus to:

generate the context matrix using a context word embedding function trained on the corpus of conversation data.

16. The apparatus of claim 14, wherein the instructions are further executable by the processor to cause the apparatus to:

generate the response matrix using a response word embedding function trained on the corpus of conversation data.

17. The apparatus of claim 14, wherein the instructions are further executable by the processor to cause the apparatus to:

generate, for the response vector, a confidence score based at least in part on the response vector and the context vector corresponding to the response vector; and identify a set of response vector context vector pairs having confidence scores greater than a confidence score threshold, wherein determining the coherence score for the response vector is based at least in part on identifying the set of response vector context vector pairs.

18. A non-transitory computer-readable medium storing code for processing a corpus of conversation data to automatically generate a set of candidate responses, the code comprising instructions executable by a processor to:

determine a set of similarity metrics for a response vector of a response matrix that comprises a plurality of response vectors by comparing the response vector to other response vectors in the response matrix, wherein the response vector is generated using a response comprising an input from the corpus of conversation data that is subsequent to a set of inputs in the corpus of conversation data comprising a context;

determine a set of fitness metrics for the response vector based at least in part on determining a probability that the response vector corresponds to a set of context vectors from a context matrix, wherein the set of context vectors is different from a context vector associated with the response vector and corresponding to the context in the corpus of conversation data;

determine a coherence score for the response vector based at least in part on the set of similarity metrics and the set of fitness metrics for the response vector;

determine a second set of similarity metrics, a second set of fitness metrics, and a second coherence score for one or more of the other response vectors from the response matrix;

cluster response vectors from the response matrix into a set of clusters based at least in part on similarities between the response vectors;

select a set of candidate response vectors from at least one cluster of the set of clusters based at least in part on coherence scores associated with response vectors in the at least one cluster; and identify the set of candidate responses based at least in part on the selected set of candidate response vectors.

19. The non-transitory computer-readable medium of claim 18, wherein the instructions are further executable to:

generate the context matrix using a context word embedding function trained on the corpus of conversation data.

20. The non-transitory computer-readable medium of claim 18, wherein the instructions are further executable to:

generate the response matrix using a response word embedding function trained on the corpus of conversation data.

21. The method of claim 1, wherein:

the context comprises a plurality of inputs from a conversation session between an agent and a user and the response comprises an input from the conversation session that is subsequent to the plurality of inputs; and the response is generated by the agent and the plurality of inputs are generated by the agent, the user, or both.

* * * * *